United States Patent [19]

Fleischer

[11] 4,231,587

[45] Nov. 4, 1980

[54] COLLAPSIBLE FRAMES FOR BABY CARRIERS

[76] Inventor: Henry Fleischer, 18 Notch Park Rd., Little Falls, N.J. 07424

[21] Appl. No.: 964,975

[22] Filed: Nov. 30, 1978

Related U.S. Application Data

[62] Division of Ser. No. 759,081, Jan. 13, 1977, abandoned.

[51] Int. Cl.³ ............................................. B62B 7/08
[52] U.S. Cl. .................................... 280/647; 280/650
[58] Field of Search ............... 280/650, 649, 648, 447; 297/45

[56] References Cited

U.S. PATENT DOCUMENTS

| | | | |
|---|---|---|---|
| 3,936,069 | 2/1976 | Giordani | 280/650 |
| 4,019,757 | 4/1977 | Beger | 280/649 |
| 4,023,825 | 5/1977 | Kassai | 280/649 |
| 4,025,088 | 5/1977 | Rothschild | 280/649 |
| 4,030,769 | 6/1977 | Peng | 280/650 |

*Primary Examiner*—Robert R. Song

[57] ABSTRACT

A series of related collapsible lightweight frames are provided which are adapted to be used in conjunction with carriers or seats to form strollers, carriages, high chairs, and the like.

11 Claims, 4 Drawing Figures

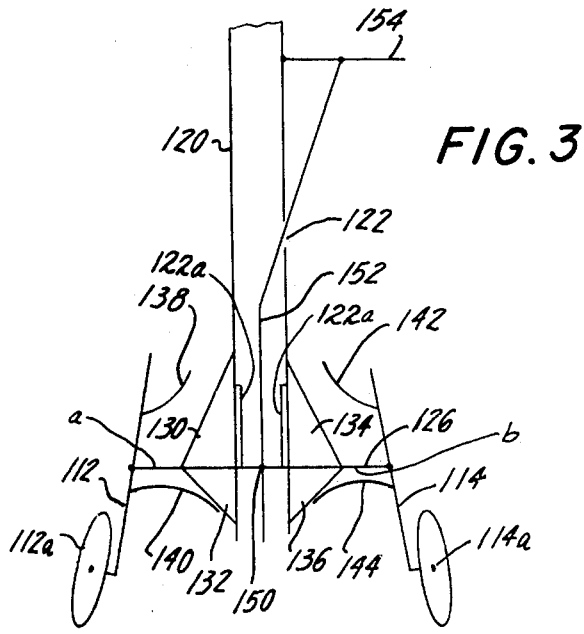
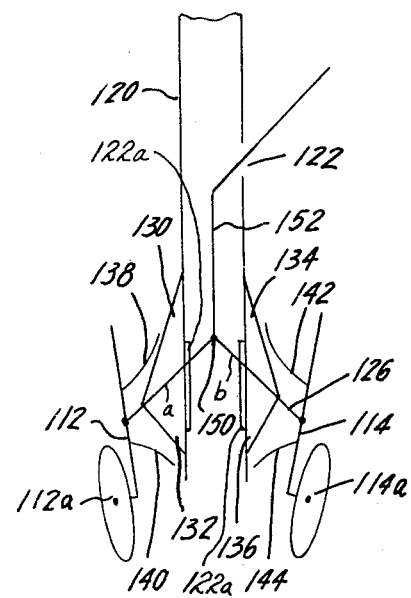

COLLAPSIBLE FRAMES FOR BABY CARRIERS

REFERENCE OF OTHER APPLICATIONS

This application is a divisional application of Ser. No. 759,081, filed Jan. 13, 1977 now abandoned.

FIELD OF THE INVENTION

The present invention relates to collapsible frames for use as strollers, carriages, high chairs and the like adapted to be employed in conjunction with carriers or seats.

BACKGROUND OF THE INVENTION

The choice in child carrying and securing devices and frames existing in the marketplace today is endless. There are many different types of devices and frames serving the same or different functions. Thus, the prospective buyer asks not only what brand of device to buy but whether frames and carriers comprising car beds, car seats, infant seats, youth seats, high chairs, bathinettes, carriages, strollers, walkers, etc. are all actually necessary. Of course, each of these devices plays an important function at one time or another. But where are they all to be stored? How is one able to pay for all of them? unfortunately, until now, the new parent had no real answers to these questions. These items are necessities so that the parent was required to purchase each device, including frame and carrier, and somehow make the necessary storage room therefor.

The present invention provides a real solution to the problem of providing each of the child holding, carrying and supporting functions discussed above in a manner so as to require a minimum of expense and storage capacity.

BRIEF STATEMENT OF THE INVENTION

In accordance with the present invention, there is provided a frame mechanism for opening or closing frames for stroller, carriages and the like, which includes at least a pair of spaced apart legs, each leg carrying at its lower end one or more wheels, a transversely disposed rod member connected to each of the legs with the legs extending above and below the rod member, and leg contact means disposed on the transversely disposed rod member and extending above and below the rod member. The legs may be collapsed by pulling up on the transverse rod member causing the leg contact means to contact upper portions of the legs thereby causing the lower portions of the legs and wheels attached thereto to pivot inwardly on the transverse rod member. When it is desired to open the legs and wheels, the transverse rod member is moved downwardly thereby causing the leg contact means to contact lower portions of the legs and thereby force the lower portions of the legs and wheels to move outwardly to their open position.

Said leg contact means comprise a series of wedges or inclined planes disposed above and below the transverse rod member, the wedges disposed above the transverse rod member being adapted to contact upper stop members to facilitate collapsing of said frame, and the wedge members disposed below the transverse rod member being adapted to contact lower stop members to facilitate opening of said frame. The stop members may comprise resilient means, such as leaf springs extending from each leg above and below the transverse rod member.

Other variations of the aforedescribed frames are also provided as will be seen hereinafter.

BRIEF DESCRIPTION OF THE ACCOMPANYING FIGURES

FIG. 3 is a schematic front view of the frame mecha shown in the preceding Figures in its open position; and FIG. 4 is a schematic front view of the frame mechanism shown in the preceding Figures in its closed or collapsed position.

Figure 1:
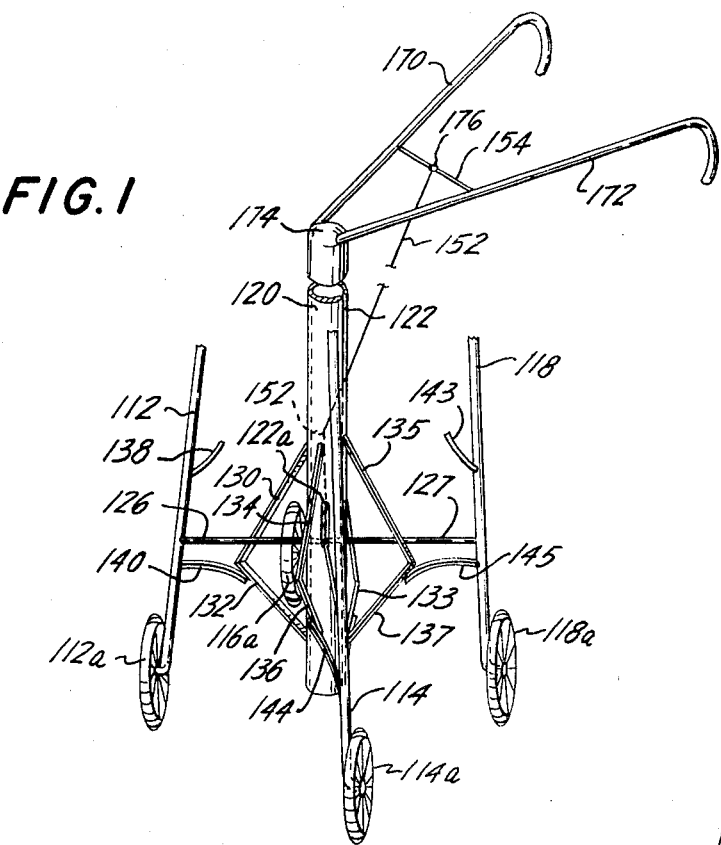
FIG. 1 is a perspective view of a collapsible frame mechanism in accordance with the present invention in its open position.

DETAILED DESCRIPTION OF ACCOMPANYING FIGURES AND PREFERRED EMBODIMENTS OF THE INVENTION

Referring now to FIGS. 1 to 14, there is shown a unique improved frame collapsing mechanism for opening and closing stroller frames and moving the legs and wheels carried by the frame from an open functioning position to a retracted position. The improved mechanism includes front legs 112, 114, carrying wheels 112a, 114a, and rear legs 116, 118 carrying wheels 116a, 118a. The frame mechanism illustrated in the Figures includes an elongated support member 120 having an elongated slot 122 in the walls thereof as shown. In addition, the support member 120 includes a pair of openings 122a in the lower portion thereof through which passes rod member 126, and a second pair of openings 122a (obscured) through which passes rod member 127, the ends of the rod member 126 being pivotally connected to the front legs 122, 114 and the ends of the rod member 127 being pivotally connected to rear legs 116, 118. Connected to the elongated support member 120 on either side of slots 122a (through which rod member 126 passes) are leg contact means such as inclined planes 130, 132 and 134, 136, and on either side of slots 122a (through which rod member 127 passes) are leg contact means such as inclined planes 131, 133, 135 and 137. Furthermore, stop members, such as leaf-type springs 138, 140 and 142, 144 are connected to front legs 112 and 114, respectively as best shown in FIGS. 3 and 4. Similar stop members in the form of leaf springs 139, 141 and 143, 145 are connected to rear legs 116, 118, respectively. Springs 139, 141 are obscured in the views shown in FIGS. 1 to 4. An intermediate portion of the rod member 126 includes pivot 150 which divides the rod member 126 into portions a and b while a second but similar pivot 150 divides the rod member 127 into portions a and b as well. The pivots 150 are connected to cable 152 which extends up through support member 120 through slot 122 therein and is connected to a cable control handle 154.

Thus, as seen, similar mechanisms including the elongated support member 120, the rod members 126, 127, the inclined planes and the leaf-type springs or other type of stop members, pivots 150 and cable 152 are employed in connection with the front and rear legs, with cable 152 being connected to pivots 150 of the rod members 126 and 127, and to cable control handle 154.

Figure 2:
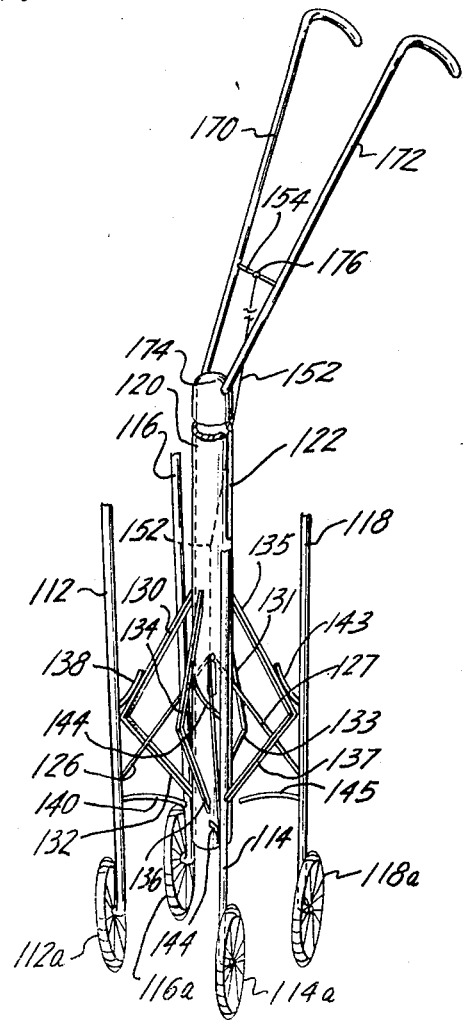
FIG. 2 is a perspective view of the collapsible frame mechanism shown in FIG. 1 in its closed or collapsed position.

As will now be apparent, as seen in FIGS. 2 and 4, when it is desired to close or retract the legs and wheels, the handle 154 is lifted upwardly causing the rod members 126, 127 (with respect to both front and rear legs and wheels) to pivot upwardly at pivots 150. With this action, the front wheels move toward each other (and the back wheels move toward each other). With respect to the front legs, the springs 138, 142 are positioned to strike the inclined planes 130, 134, respectively, (while the springs 139, 143 are positioned to strike the inclined planes 131, 135) thereby causing the legs 112 and 114 and legs 116, 118 and wheels carried thereby to move inwardly or close. When it is desired to open the frame, the handle 154 may be moved downwardly thereby causing pivots 150 of rod member 126,127 to move downwardly and cause springs 140 and 144 to contact inclined planes 132 and 136 (and springs 141, 145 to contact inclined planes 133, 137), respectively, to cause the front and rear legs and wheels to move to their open functional position. The springs 140, 144 and 141, 145 remain in contact with inclined planes 132, 136 and 133, 137, respectively, to maintain the legs in their open position.

It will be appreciated that either the legs (and springs carried thereby) may be made to move or the rod members 126, 127 (and inclined planes carried by the elongated support member 120) may be made to move or both may be made to move to open or retract the legs and wheels. Furthermore, any type mechanism may be employed to move the cable 152 or the rod members 126, 127 or the springs or inclines planes to achieve the desired result. Thus, the control and functioning of the inclined plane-spring arrangements is similar with respect to each of the front pair and the rear pair of legs and wheels. In fact, all of the four legs may be easily controlled from any of the control means described herein.

The cable 152 may be even linked to a canopy so that opening or closing of the canopy will open or collapse the legs and wheels. Canopy support members may include a lock to retain the canopy in the desired open position.

In the above frames, the handles 170, 172 may be connected to cable 152. Thus, when handles 170, 172 are pivoted upwardly or downwardly via pivot 174 or moved inwardly or outwardly via pivoted brace 176, the cable 152 may cause the rod members 126, 127 to move or pivot thereby opening or closing the legs and wheels.

What is claimed is:

1. A frame mechanism for opening or closing frames for strollers, carriages and the like, comprising, in combination, at least a pair of spaced apart legs, each leg carrying at its lower end one or more wheels, a transversely disposed rod member connected to each of said legs with said legs extending above and below said transverse rod member, a longitudinally disposed elongated support member disposed between said legs, said longitudinal support member including openings through which said transverse rod member extends, said openings defining a path of movement for said transverse rod member as said transverse rod member is pulled upwardly thereby carrying said legs and wheels to a collapsed position, leg contact means disposed on said longitudinal support member and extending above and below said rod member, whereby said legs may be collapsed by pulling up on said transverse rod member causing said leg contact means to contact upper portions of said legs thereby causing the lower portions of said legs and said wheels attached thereto to pivot inwardly on said transverse rod member and when it is desired to open the legs and wheels, the transverse rod member is moved downwardly thereby causing said leg contact means to contact lower portions of said legs and thereby force said lower portions of said legs and said wheels to move outwardly to and remain in their open position.

2. The mechanism as defined in claim 1 further including upper and lower stop members connected on each of said legs, said upper stop members extending above and said lower stop members extending below said transverse rod member, the upper stop members being adapted to contact said leg contact means and force the legs and wheels inwardly toward each other upon collapsing of said legs and wheels, and the lower stop members being adapted to contact said leg contact means and force the legs outwardly and away from each other upon opening of said frame.

3. The mechanism as defined in claim 2 wherein said leg contact means comprise wedge members disposed above and below said transverse rod member, the wedge members disposed above said transverse rod member being adapted to contact said upper stop members to facilitate collapsing of said frame, and the wedge members disposed below said transverse rod member being adapted to contact said lower stop members to facilitate opening of said frame, said lower stop members remaining in contact with said wedge members disposed below said transverse rod member when said legs are in their open position.

4. The mechanism as defined in claim 2 wherein said series of stop members comprise resilient means.

5. The mechanism as defined in claim 4 wherein said resilient means comprise leaf springs extending from each leg above and below said transverse rod member.

6. The mechanism as defined in claim 1 wherein said transverse rod member includes an intermediately disposed rod pivot point, whereby by pulling up on said rod pivot point upper portions of said legs are made to contact said leg contact means forcing lower portions of said legs and wheels to pivot inwardly toward each other.

7. The mechanism as defined in claim 6 further including cable means connected to said rod pivot point for pulling said pivot point up to collapse said legs and wheels.

8. The mechanism as defined in claim 1 wherein said openings of said longitudinal support member comprise at least a pair of spaced apart vertical slots through which said transverse rod member extends and defining a vertical path for said transverse rod member as said transverse rod member is pulled upwardly to collapse said legs and wheels.

9. The mechanism as defined in claim 1 including cable means attached to said transverse rod member and adapted to be pulled upwardly forcing at least a portion of said transverse rod member upwardly.

10. The mechanism as defined in claim 9 wherein said cable means extends through said longitudinal support member to a remotely controlled position.

11. The mechanism as defined in claim 10 further including handle means pivotally connected to said longitudinal support member and wherein said cable means is connected to said handle means.

* * * * *